(12) United States Patent
Harada et al.

(10) Patent No.: US 11,191,043 B2
(45) Date of Patent: Nov. 30, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daiki Takeda, Tokyo (JP); Satoshi Nagata, Tokyo (JP); Jing Wang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/609,707

(22) PCT Filed: May 2, 2017

(86) PCT No.: PCT/JP2017/017297
§ 371 (c)(1),
(2) Date: Oct. 30, 2019

(87) PCT Pub. No.: WO2018/203398
PCT Pub. Date: Nov. 8, 2018

(65) Prior Publication Data
US 2020/0059810 A1    Feb. 20, 2020

(51) Int. Cl.
*H04W 56/00* (2009.01)
*H04W 24/10* (2009.01)
*H04W 48/10* (2009.01)

(52) U.S. Cl.
CPC ....... *H04W 56/0005* (2013.01); *H04W 24/10* (2013.01); *H04W 48/10* (2013.01); *H04W 56/0015* (2013.01); *H04W 56/005* (2013.01)

(58) Field of Classification Search
None
See application file for complete search history.

(56) References Cited

U.S. PATENT DOCUMENTS

| | | | |
|---|---|---|---|
| 2014/0204825 A1 | 7/2014 | Ekpenyong et al. | |
| 2014/0206341 A1* | 7/2014 | Siomina | H04W 36/0088 455/422.1 |
| 2014/0349664 A1* | 11/2014 | Pedersen | H04W 36/06 455/450 |
| 2015/0009898 A1* | 1/2015 | Rosa | H04L 5/001 370/328 |
| 2016/0013984 A1* | 1/2016 | Sun | H04L 41/0866 370/252 |
| 2017/0171771 A1* | 6/2017 | Jung | H04W 24/10 |
| 2017/0195942 A1* | 7/2017 | Zhao | H04W 24/02 |

(Continued)

FOREIGN PATENT DOCUMENTS

JP    2016511565 A    4/2016

OTHER PUBLICATIONS

International Search Report issued in PCT/JP2017/017297 dated Jul. 18, 2017 (2 pages).

(Continued)

*Primary Examiner* — Bunjob Jaroenchonwanit
(74) *Attorney, Agent, or Firm* — Osha Bergman Watanabe & Burton LLP

(57) ABSTRACT

A terminal is disclosed including a receiver that receives a synchronization signal block including a synchronization signal and a broadcast channel, and a processor that, if specified information is notified to the terminal, derives, based on a timing of a serving cell, a synchronization signal block index for another cell. In other aspects, a radio communication method for a terminal is also disclosed.

9 Claims, 9 Drawing Sheets

(56) References Cited

U.S. PATENT DOCUMENTS

| | | | |
|---|---|---|---|
| 2017/0215097 A1* | 7/2017 | Park | H04L 5/0048 |
| 2018/0084593 A1* | 3/2018 | Chen | H04L 5/0048 |
| 2018/0220360 A1* | 8/2018 | Sheng | H04J 11/0073 |
| 2018/0302819 A1* | 10/2018 | Lee | H04B 7/0626 |
| 2019/0103931 A1* | 4/2019 | Yl | H04B 7/0639 |
| 2019/0230580 A1* | 7/2019 | Kim | H04W 48/12 |
| 2019/0254011 A1* | 8/2019 | Kasparick | H04W 48/18 |
| 2019/0254050 A1* | 8/2019 | Kusashima | H04W 72/1263 |
| 2019/0254110 A1* | 8/2019 | He | H04W 76/27 |
| 2019/0357159 A1* | 11/2019 | Pan | H04L 1/1861 |
| 2020/0022010 A1* | 1/2020 | Kim | H04W 24/02 |
| 2020/0029315 A1* | 1/2020 | Lin | H04L 1/0075 |
| 2020/0112846 A1* | 4/2020 | Moon | H04J 11/0073 |
| 2020/0137592 A1* | 4/2020 | Guo | H04W 72/0473 |
| 2020/0186404 A1* | 6/2020 | Si | H04J 11/0076 |
| 2020/0287752 A1* | 9/2020 | Chatterjee | H04L 25/0226 |
| 2020/0305197 A1* | 9/2020 | Kim | H04W 72/0446 |

OTHER PUBLICATIONS

Written Opinion of the International Searching Authority issued in PCT/JP2017/017297 dated Jul. 18, 2017 (4 pages).

ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).

NTT DoCoMo, Inc.; "Discussion and evaluation on NR-PBCH design"; 3GPP TSG RAN WG1 Meeting #88bis, R1-1705708; Spokane, USA; Apr. 3-7, 2017 (9 pages).

Office Action issued in the counterpart Japanese Patent Application No. 2019-516334, dated Jul. 14, 2020 (8 pages).

NTT DoCoMo, Inc.; "Discussion on SS periodicity for NR"; 3GPP TSG RAN WG1 Meeting #88bis, R1-1705707; Spokane, USA; Apr. 3-7, 2017 (4 pages).

Office Action issued in Japanese Application No. 2019-516334; dated Dec. 15, 2020 (8 pages).

Office Action issued in Chilean Application No. 201903155; dated Nov. 16, 2020 (21 pages).

3GPP TSG RAN WG1 #88; R1-1702903 "SS Periodicity" Samsung; Athens, Greece; Feb. 13-17, 2017 (7 pages).

3GPP TSG-RAN WG1 #88; R1-1703097 "DL Signals for Mobility Measurements in NR and Mobility schemes" Nokia, Alcatel-Lucent Shanghai Bell; Athens, Greece; Feb. 13-17, 2017 (12 pages).

3GPP TSG RAN WG1 Meeting #88bis; R1-1704440 "Discussion on DL RRM Measurement" MediaTek Inc.; Spokane, USA; Apr. 3-7, 2017 (5 pages).

3GPP TSG RAN WG1 Meeting #88bis; R1-1704865 "NR PBCH Design" LG Electronics; Spokane, USA; Apr. 3-7, 2017 (16 pages).

Extended European Search Report issued in European Application No. 17908454.6, dated Oct. 30, 2020 (11 pages).

3GPP TSG-RAN WG1 Meeting #88b; R1-1706398 "WF on SS Burst Set Timing Indication" Samsung, CATT, Intel, Nokia, Alcatel-Lucent Shanghai Bell, ZTE, ZTE Microelectronics, Ericsson, KRRI, InterDigital,[LGE], Motorola Mobility, Lenovo; Spokane, USA; Apr. 3-7, 2017 (4 pages).

Reconsideration Report by Examiner before Appeal issued in Japanese Application No. 2019-516334; dated May 19, 2021 (7 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rels. 10, 11, 12 and 13) has been standardized for the purpose of achieving increased capacity and enhancement beyond LTE (LTE Rels. 8 and 9).

Successor systems of LTE are also under study (for example, also referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rels. 8 to 13), a user terminal (UE (User Equipment)) detects synchronization signals (PSS (Primary Synchronization Signal), SSS (Secondary Synchronization Signal), etc.) by way of cell search, and establishes synchronization with the network (for example, a base station (eNB (eNode B))), and identifies the cell to connect to (which is identified, for example, based on a cell ID (IDentifier)).

Also, after the cell search, the UE receives the master information block (MIB (Master Information Block)), which is transmitted in a broadcast channel (PBCH (Physical Broadcast CHannel)), system information blocks (SIBs)), which are transmitted in a shared data channel (PDSCH (Physical Downlink Shared CHannel)), and/or others, and acquires configuration information (which may be referred to as "broadcast information," "system information," etc.) that is for use for communicating with the network.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Now, envisaging future radio communication systems (for example, NR), a study is in progress to define a resource unit that includes synchronization signals and a broadcast channel as an SS block (Synchronization Signal block) and gain initial access based on this SS block.

In addition, a study is in progress to perform SS block-based measurements for other cells than the serving cell. In this case, it is preferable to specify and report which other cells' which SS blocks have been measured. However, there is a problem that, to specify SS blocks for other cells, the UE has to suffer an increased burden.

The present invention has been made in view of the above, and it is therefore an object of the present invention to provide a user terminal and a radio communication method that can reduce the increase in processing load on a UE even when communication is controlled based on SS blocks.

Solution to Problem

In accordance with one aspect of the present invention, a user terminal has a receiving section that receives one or more synchronization signal blocks containing a synchronization signal and a broadcast channel at least in a serving cell, and a control section that decides whether or not to decode a broadcast channel contained in a synchronization signal block for another cell based on predetermined information.

Advantageous Effects of Invention

According to the present invention, even when communication is controlled based on SS blocks, it is possible to reduce the increase in processing load on UEs.

DESCRIPTION OF EMBODIMENTS

Envisaging future radio communication systems (which include, for example, LTE Rels. 14, 15 and later versions, 5G, NR and/or others, and which hereinafter will be also referred to as "NR"), a study is in progress to define a resource unit that includes synchronization signals and a broadcast channel as an SS block (Synchronization Signal block), and gain initial access based on this SS block.

Figure 1:
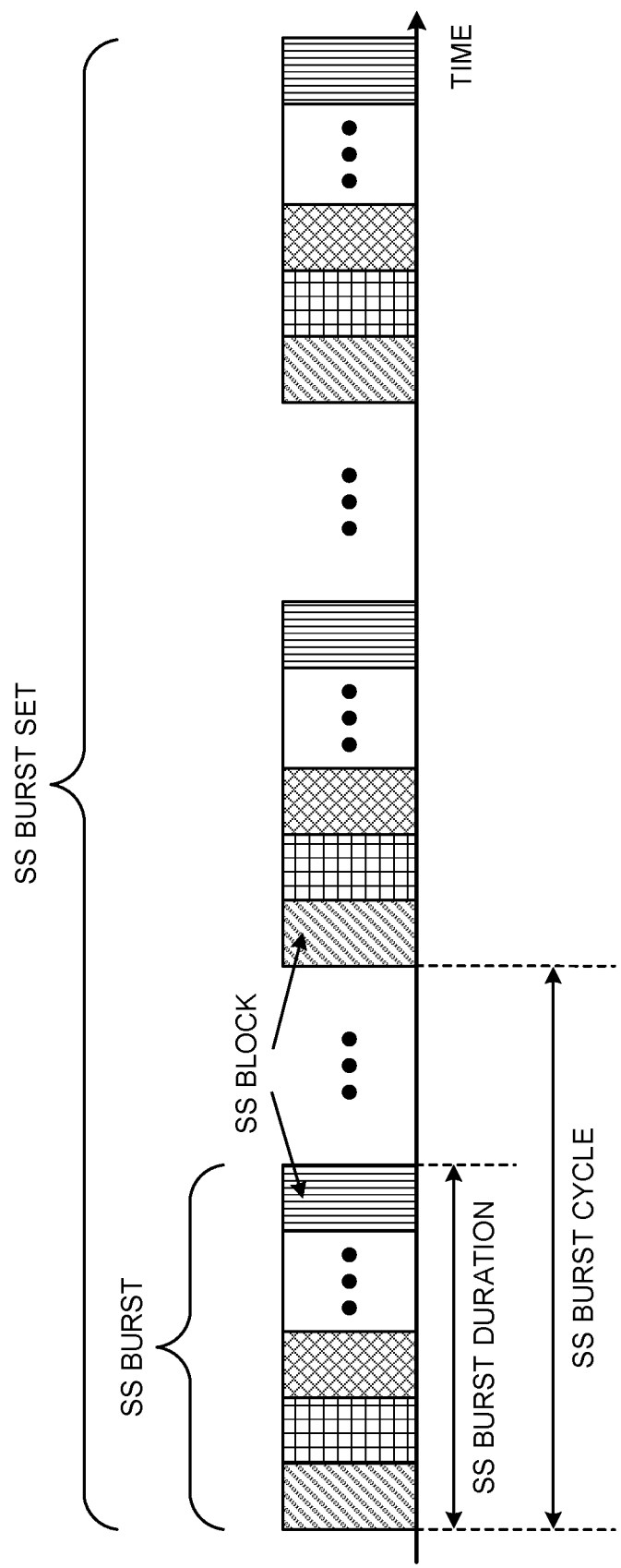
FIG. 1 is a diagram to explain the concept of SS blocks.

SS blocks will be described with reference to FIG. 1. FIG. 1 is a diagram to explain the concept of SS blocks. An SS block, shown in FIG. 1, at least contains a PSS for NR (NR-PSS), an SSS for NR (NR-SSS) and a PBCH for NR (NR-PBCH), which can be used for the same use as the PSS, the SSS and the PBCH of existing LTE systems. Note that an SS block may also contain a synchronization signal (TSS (Tertiary SS)) apart from the PSS and the SSS.

A set of one or multiple SS blocks may be referred to as an "SS burst." According to this example, an SS burst is comprised of a plurality of SS blocks that are continuous in time, but this is by no means limiting. For example, an SS burst may be formed with SS blocks of consecutive frequency and/or time resources, or may be formed with SS blocks of non-consecutive frequency and/or time resources.

It is preferable that SS bursts are transmitted in a certain cycle (which may be referred to as the "SS burst cycle"). Alternatively, SS bursts may not be transmitted periodically (may be transmitted aperiodically). As for the length of SS bursts and/or the cycle of SS bursts, SS bursts may be transmitted in durations such as one or multiple subframes, one or multiple slots, and so on.

Also, one or multiple SS bursts may be referred to as an "SS burst set (SS burst series)." For example, a base station (which may be referred to as a "BS (Base Station)," a "TRP (Transmission/Reception Point)," "eNB (eNode B)," "gNB," etc.)) and/or a UE may use one or multiple SS bursts included in one SS burst set to apply beam sweeping to a plurality of SS blocks and transmit the SS burst.

Note that SS burst sets are preferably transmitted periodically. The UE may control the receiving processes on the assumption that SS burst sets are transmitted periodically (in an SS burst set cycle).

The NR-PSS and the NR-SSS, or the NR-PSS (NR-SSS) and the NR-PBCH, may be time-division-multiplexed (TDM) or frequency-division-multiplexed (FDM).

For NR, the following initial access procedures using SS blocks are under study. First, the UE detects the NR-PSS (step S101). The UE roughly synchronizes time and frequency based on step S101, and identifies the scrambling ID (may be referred to as the "local ID") of an NR-SSS transmitted in an NR cell (a cell that supports NR).

Next, the UE detects the NR-SSS (step S102). The relative resource locations of the NR-PSS and the NR-SSS are specified in the specification. After completion of step S102, the UE can specify the cell ID.

The UE detects and decodes the NR-PBCH (step S103). The relative resource location of the NR-PBCH with respect to the NR-SSS (or the NR-PSS) is specified in the specification. Also, the UE can perform channel estimation for decoding the NR-PBCH based on a certain reference signal (for example, a DMRS (DeModulation Reference Signal)).

The NR-SSS and the NR-PBCH detected in steps S102 and S103 each correspond to the same SS block index as that of the NR-PSS.

The UE detects and decodes a downlink control channel (for example, a control channel for NR (NR-PDCCH (Physical Downlink Control CHannel))), which is necessary to receive minimal system information (which, for example, may be referred to as "RMSI (Remaining Minimum System Information)") (step S104). The UE identifies configuration information of the NR-PDSCH for communicating RMSI based on the NR-PDCCH.

The UE can detect the NR-PDCCH by monitoring a certain control resource set. Note that a control resource set refers to a set of candidate resources for transmitting a downlink control channel (NR-PDCCH), and may be referred to as a "CORSET (COntrol Resource SET)," a "control subband," a "control channel search space," a "search space set," a "search space resource set," a "control field," a "control subband," an "NR-PDCCH field," and so on. In the present specification, a control resource set is primarily anticipated to be a set of control resources necessary for receiving RMSI, but this is by no means limiting.

The UE decodes the NR-PDSCH and acquires RMSI based on the NR-PDSCH configuration information identified in step S104 (step S105). The UE identifies at least the RACH (Random Access CHannel) configuration based on the RMSI.

The UE performs random access procedures based on the RACH configuration (step S106).

Note that, in NR, system operation using a single beam or multiple beams is under research. For example, in the event of multi-beam operation, it may be possible to apply beam sweeping to multiple SS blocks and repeat transmitting a whole SS burst set periodically. Also, an NR-PSS, an NR-SSS and an NR-PBCH corresponding to the same SS block index may be transmitted in the same beam.

Now, in NR, a study is in progress to allow a UE to perform not only cell-level measurements, but also SS block-level measurements. SS block-level measurements may be, for example, RSRP measurements of SS blocks, RSRP measurements of CSI-RSs during connected mode, and so on. A study is underway to measure the RSRP of SS blocks (SS block RSRP) based on the NR-SSS (and the PBCH demodulation DMRS). In the event CSI-RS measurements are to be conducted, it is necessary to check whether or not there is a cell and to ensure the timing, and the cell's timing information may be acquired from SS blocks.

Timing information of an SS block may be referred to as, for example, the "time index" of the SS block. An SS block's time index may be represented by, for example, one of an SS burst set index, an SS burst index (within an SS burst set), an SS block index, a symbol index, a slot index, a system frame number and so on, or a combination of these.

Note that, for example, as for the SS block index, the same index may be used between SS bursts in an SS burst set, or a different index may be used for each SS block in an SS burst set.

In addition, in NR, study is in progress to measure not only the serving cell but also cells other than the serving cell (for example, neighboring cells). As mentioned earlier, RSRP measurements on an SS block level are necessary even for other cells.

Now, when the RSRP measurement result of an SS block is reported from the UE to the network, it may be possible to include information that can identify the SS block (for example, the SS block index) in the report. The network specifies the SS block that corresponds to the report, so that, for example, the network can judge which beam's quality is good from the viewpoint of the UE, and switch beams smoothly.

Furthermore, SS block indices and CSI-RS-specifying information (for example, CSI-RS IDs) may be linked in advance, so that efficient use is possible. For example, the network assigns CSI-RSs to all cells. The network specifies (limits) which CSI-RS is to be measured, on a per UE basis, based on SS block RSRPs and SS block indices reported from UEs. According to this configuration, a UE needs to measure only the designated CSI-RS, so that the load on the UE can be reduced.

It is thus clear that the SS block indices transmitted using the NR-PBCH are useful information for the network and UEs.

However, when a UE tries to acquire SS block indices from the NR-PBCHs contained in other cells' SS blocks, the UE needs to decode the NR-PBCH from each SS block for all of these other cells, so that increased processing delay and load on the UE become a problem.

Therefore, the present inventors have worked on a method that can reduce the decrease in communication throughput and so on even when communication is controlled based on SS blocks, and arrived at the present invention.

According to one aspect of the present invention, a user terminal receives one or more synchronization signal blocks (hereinafter referred to as "SS blocks") that contain synchronization signals and a broadcast channel (hereinafter referred to as "PBCH"), at least from the serving cell, and decides whether or not to decode the PBCHs contained in SS blocks for other cells based on predetermined information.

According to one aspect of the present invention, whether or not to decode the PBCHs contained in SS blocks for other cells is decided based on predetermined information, so that cases occur where it is not necessary to decode the PBCHs in SS blocks. In this way, it is possible to quit decoding PBCHs depending on predetermined information, so that, even when communication is controlled based on SS blocks, the increase in processing load on UEs can be reduced.

In the above-noted aspect of the present invention, the predetermined information is a command as to whether or not to decode the PBCHs contained in SS blocks for other cells. For example, the network reports, to the UE, whether or not SS blocks for other cells do not need to be read. Alternatively, the condition for the UE not to read SS blocks for other cells may be set forth in the specification in advance. A report as to whether or not to read SS blocks for other cells and the condition for not having to read SS blocks for other cells, set forth in the specification, can be used as indications as to whether or not to decode PBCHs.

In the above-noted aspect of the present invention, the UE can use, as the predetermined information, information as to whether or not the other cell that is subject to measurements is synchronized with the serving cell. This information may be a piece of information that explicitly indicates whether or not neighbor cell that uses the frequency to be measured is synchronized with the serving cell, or may be another piece of configuration information that is linked with whether or not synchronization is established. Assuming that the UE knows in advance that another cell is synchronized with the serving cell, the UE can identify the boundaries of frames and slots in the other cell only if the UE can detect the synchronization signals in SS blocks for the other cell, without even demodulating the PBCHs and reading the SS blocks' timing information (for example, the time indices).

In the above-noted aspect of the present invention, the UE can use, as the predetermined information, information as to whether or not other cells that are subject to measurements adopt single-beam operation. The information may be a piece of information that explicitly indicates whether or not single-beam operation is employed, or another piece of configuration information that is linked with whether a single beam is used or not. If the UE knows in advance that other cells adopt single-beam operation, and the UE can detect synchronizations signals in an SS block from another cell, given that this SS block is the only SS block in the cell, even without reading the SS block index from the PBCH, the UE can specify the index of the SS block in another cell from known information (for example, RRC signaling) and the like.

In the above-noted aspect of the present invention, when the PBCHs contained in SS blocks for other cells are not decoded, the timing at which an SS block is detected in another cell may be specified based on a certain timing in the serving cell. For example, if the UE detects an SS block based on synchronization signals contained in an SS block for another cell (however, the UE does not decode the PBCH), the UE identifies the timing of detecting the SS block in another cell as a time offset for a certain timing in the serving cell. The UE may report the time offset to the network as information to replace timing information (for example, an SS block time index) of the SS block detected in another cell. The network can identify which SS block the UE has detected, from the time offset with respect to the SS block reported from the UE.

In the above-noted aspect of the present invention, when the UE does not decode the PBCH contained in another cell's SS block, control is executed so that at least part of the indices for specifying the SS block of another cell is not contained in a measurement report using the SS block of another cell. For the serving cell only, the UE may include an index for identifying the SS block of the serving cell in the measurement report using the SS block.

In the above aspect, when the UE decides whether or not to decode the PBCHs contained in SS blocks for the other cell based on predetermined information and, as a result, decodes the PBCH included in an SS block for the other cell, the UE may apply different RRM (Radio Resource Measurement) requirements to measurements for the other cell (including SS block-level measurements) than the case of not decoding the PBCHs included in the SS blocks.

For example, when decoding the PBCH included in an SS block for another cell, the UE can apply a more moderate RRM requirement to measurements for the other cell than when the PBCH is not decoded. This RRM requirement may include at least one of the requirement for at least the measurement delay, a side condition of the SINR (Signal to Interference plus Noise Ratio), and the number of cells to be reported. According to this configuration, it is possible to reduce the load on the UE that decodes the PBCHs contained in SS blocks for other cells.

Now, embodiments of the present invention will be described in detail below with reference to the accompanying drawings. Note that the radio communication methods according to each embodiment may be applied individually or may be applied in combination.

Note that, in the following embodiments, the prefix "NR-" that is used in relationship to signals and channels may be omitted.

Radio Communication Method

First Embodiment

According to a first embodiment of the present invention, a UE decides whether or not to decode the PBCHs contained in SS blocks for other cells based on predetermined information. Here, the "predetermined information," which the UE uses to decide whether or not to decode the PBCHs contained in SS blocks for other cells, may be reported (configured) to the UE by using higher layer signaling (for example, RRC (Radio Resource Control) signaling, MAC (Medium Access Control) signaling (for example, MAC CEs (Control Elements)), broadcast information, etc.), physical layer signaling (for example, DCI (Downlink Control Information)), or a combination of these, or may be specified in the specification.

For example, RRC signaling or SIBs, which are reported from the network, may be used to explicitly command the UE not to decode the PBCHs contained in SS blocks for other cells (and may also be used when decoding of the PBCH is not commanded). If the UE is commanded not to decode the PBCHs contained in SS blocks for other cells, based on RRC signaling or an SIB, the UE detects SS blocks based on synchronization signals (PSS and SSS) included in SS blocks for other cells, while not decoding the PBCHs included in these SS blocks.

Even when the UE does not decode the PBCHs contained in SS blocks for other cells, if other cells that are to be measured are synchronized with the serving cell, the UE can acquire information that specifies these other cells' SS blocks.

Figure 2:
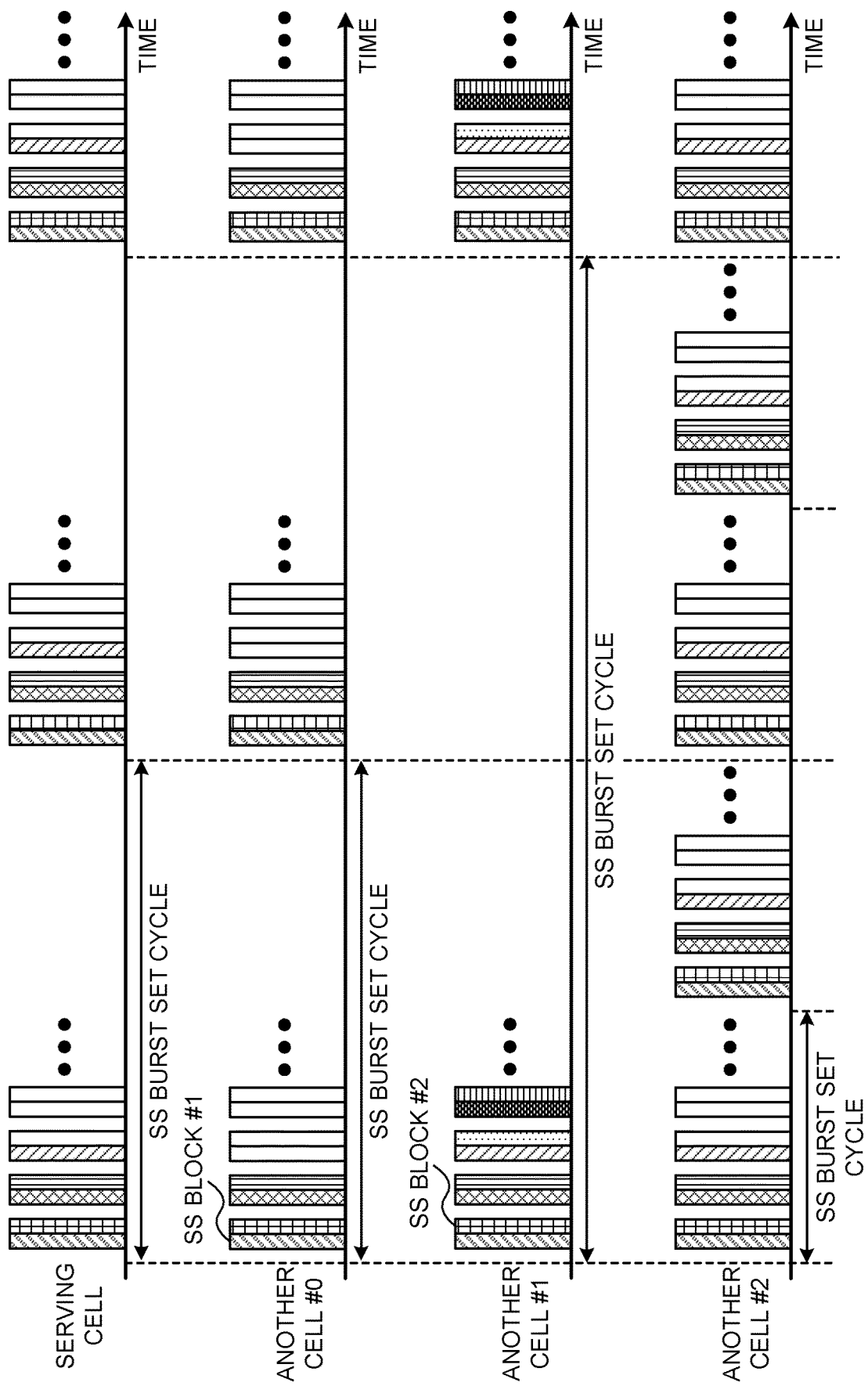
FIG. 2 is a diagram to show an example of specifying SS blocks in a synchronous NW.

FIG. 2 is a diagram to show an example of specifying SS blocks in a synchronous NW. This example shows time resources for SS blocks in a state where other cells are synchronized with the serving cell. The serving cell and other cells (for example, neighboring cells of the serving cell) #0, #1 and #2 are synchronized, and the beginning of a certain SS burst set matches between the cells.

In the serving cell, multiple SS bursts are transmitted in an SS burst set cycle, and five SS blocks are contained in one SS burst. The SS burst set cycle of another cell #0 is the same as in the serving cell, and one SS burst contains four SS blocks. Another cell #1 has a longer SS burst set cycle than the serving cell (for example, an SS burst cycle that is twice as long as that of the serving cell), and another cell #2 has a shorter SS burst set cycle than the serving cell (for example, an SS burst cycle that is half that of the serving cell).

A case will be described below as an example in which a UE detects SS blocks in another cell #0 in the situation of FIG. 2 where cells are synchronized. Assume that, in another cell #0, a UE detects the synchronization signals of the first SS block (SS #1), among the four SS blocks included in an SS burst, and detects the first SS block. Although the time index of this SS block (SS #1) can be determined by decoding the PBCH included in the first SS block (SS #1), according to this example, timing information (SS block time index) of this SS block (SS #1) is specified without decoding the PBCH.

For example, the UE judges which frame, slot and/or symbol timing in the serving cell the timing at which the first SS block (SS #1) is detected matches. If it is made clear which frame, slot and/or symbol timing in the serving cell the first SS block (SS #1) in another cell #0 matches, it becomes clear which frame, slot and/or symbol timing in another cell #0 the first SS block (SS #1) corresponds to.

In this way, given the first SS block (SS #1) of another cell #0, the frame, the slot and/or the symbol timing in another cell #0 become clear. This allows the UE to know the timing of an SS block (SS #1) that is detected in another cell #0, without even reading the time index from the PBCH of the first SS block of another cell #0, and identify the boundaries of frames and slots in another cell #0.

As shown in FIG. 2, other cells #1 and #2 are cells with different SS burst set cycles from that of the serving cell. As with another cells #0, given an SS block that is detected, the frames, slots and/or symbol timings in other cells #1 and #2 can be specified. For example, assume that, in another cell #1, the UE detects the synchronization signals of a second SS block (SS #2), among a plurality of SS blocks contained in an SS burst, and detects the second SS block (SS #2).

The UE specifies which frame, slot and/or symbol timing in the serving cell the timing at which the target second SS block (SS #2) is detected corresponds to. Although the SS burst set cycle of another cell #1 is longer than that of the serving cell, since the UE knows the frame, slot and/or symbol timing in the serving cell, the UE can specify the timing of the SS block detected in another cell #1 in the same way as described above.

Then, the UE specifies which frame, slot and/or symbol timing in original another cell #1 the frame, slot and/or symbol timing corresponding to the SS block detected in the serving cell corresponds to. This makes it possible to determine which frame, slot and/or symbol timing in another cell #1 the second SS block (SS #2), which is the measurement target in another cell #1, corresponds to.

When the UE measures RRM (for example, measures RSRP) using an SS block in another cell, the UE may transmit, in addition to the RRM measurement result, a measurement report that contains timing information (timing information with reference to the serving cell) of the SS block in the other cell and/or the SS block index (information derived based on the timing of the serving cell), to the network.

The network can specify this SS block from the timing information and/or index information of the SS block contained in the report, determine which beam shows good quality at the UE, and execute adequate beam control (for example, handover).

When another cell to be measured adopts single-beam operation, the UE can identify the SS blocks in another cell without decoding the PBCHs included in the SS blocks of another cell. If another cell adopts single-beam operation, SS blocks having the same SS block index are transmitted in repetition in an SS burst set cycle, in this another cell. Therefore, if synchronization signals are detected in an SS block in another cell, it is possible to assume that this detected SS block is an SS block having the same SS block index that is repeatedly transmitted in this another cell.

In the situation where another cell adopts single-beam operation, if an SS block is detected in another cell, this SS block is the only SS block in this another cell, so that the UE can identify this SS block without even decoding the PBCH. For example, this case is handled as if an SS block having a certain SS block index (for example, index #0) were detected. Alternatively, it is not necessary to specify the SS block index corresponding to the detected SS block.

Note that information on about an SS block (for example, an SS block index) used in a cell where single-beam operation is adopted may be specified in the specification, or may be reported to the UE by way of higher layer signaling (for example, RRC signaling), and so on.

When the UE measures RRM using an SS block in another cell, the UE may transmit, in addition to the RRM measurement result, a measurement report that contains a certain SS block index (for example, index #0) to the network.

If the UE does not specify the SS block index of another cell's SS block, the UE does not have to place an SS block index in the report. For example, the UE may send a report including a cell ID and an RRM measurement result to the network.

In the situation where another cell to be measured adopts single-beam operation, the network receives the RRM measurement result of the SS block for another cell from the UE. In this case, since the network knows the SS block index used in each cell, even if the report contains no SS block index, the network can still identify the SS block and move on to subsequent processes.

Second Embodiment

According to a second embodiment of the present invention, different RRM requirements are applied when an NR-PBCH contained in an SS block for another cell is decoded and when the NR-PBCH is not decoded. For example, as RRM (Radio Resource Measurement) requirements, at least one of a side condition of the SINR, the time of measurement, the accuracy of measurement, and the number of signals to be measured may be defined.

The lower limit value of the cell-level SINR to be detected may be defined as a side condition of the SINR. The maximum delay time for measurement delay may be defined as the time of measurement. As for the number of signals to be measured, the number of cells where measurement results are reported to the network, the maximum number of cells, and so on may be specified.

For example, in the event the UE decides whether or not to decode the NR-PBCH contained in an SS block for another cell based on predetermined information, and, as a result of this, decodes the NR-PBCH of the SS block, the UE applies relaxed RRM requirements compared to when not decoding the NR-PBCH of the SS block.

For example, assume the case where the UE measures an SCC in a non-active state (for example, RRM measurement) and reports the measurement result to the network. The network may control the SCC's configuration state (active state or non-active state) and so on based on the measurement result reported from the UE, and so on.

When the UE decodes the NR-PBCH contained in an SS block for another cell, at least one of the requirements for measurement delay, a side condition of the SINR, and the number of cells to be reported may be relieved. For example, if the UE decodes the NR-PBCHs in SS blocks for other cells, the UE may report the measurement results of fewer cells than when not decoding the NR-PBCHs.

According to the second embodiment, when the UE decodes the NR-PBCHs of SS blocks, the UE can apply more moderate RRM requirements compared to when the NR-PBCHs of SS blocks are not decoded, so that it is possible to reduce the increase in the load on UEs when communication is controlled based on SS blocks.

According to the above aspect, the UE decodes the PBCH contained in an SS block for another cell, reads the time index, and reports the time index to the network. According to another aspect, the UE may report an index that is equivalent to an SS block time index, to the network, without reading the time index from the PBCH in an SS block.

To be more specific, when, based on synchronization signals in an SS block for another cell, the UE detects this SS block for another cell, the UE detects the time offset of the timing at which this SS block is detected, from a certain timing in the serving cell, without decoding the PBCH of the SS block. In addition, the UE reports the detected time offset (which may be referred to as a "time index") to the network as an index that is equivalent to an SS block time index.

Figure 3:
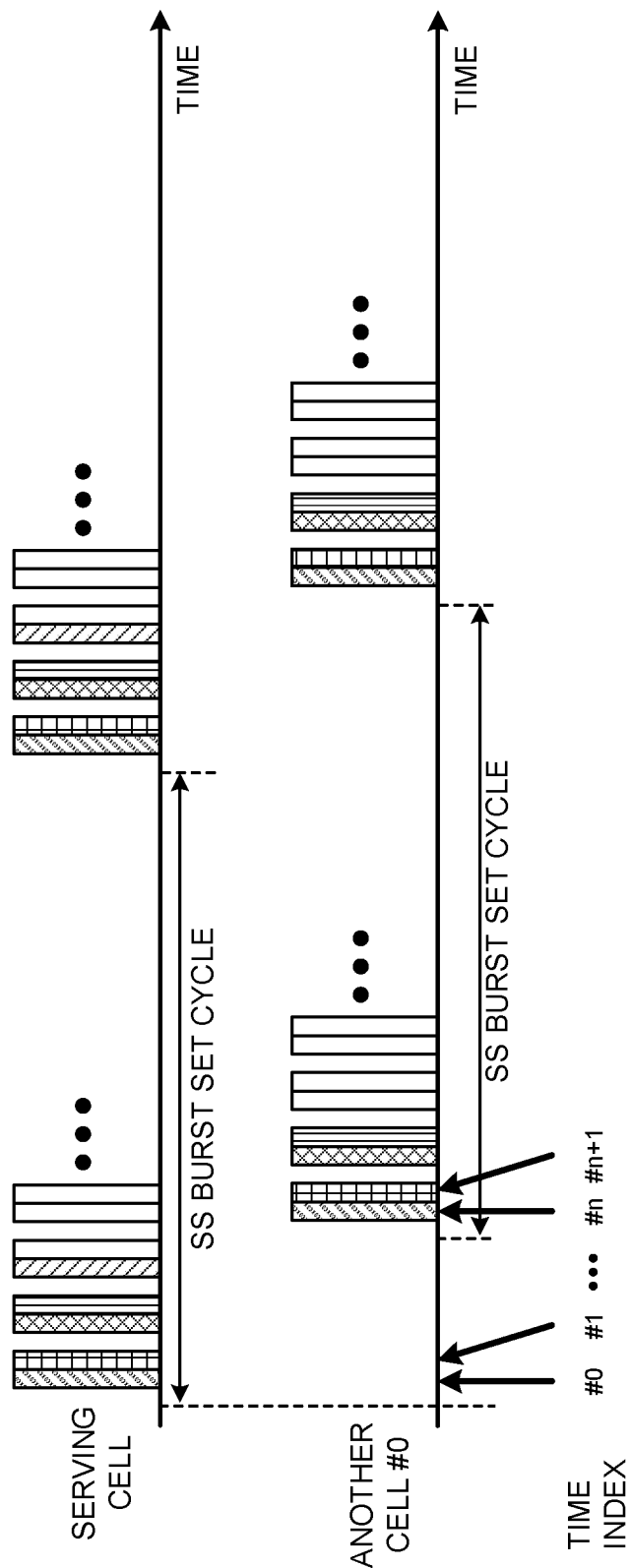
FIG. 3 is a diagram to show an example of specifying SS blocks, according to a second embodiment of the present invention.

FIG. 3 is a diagram to show an example of specifying SS blocks according to the second embodiment. In this example, as the timing at which an SS block for another cell is detected, an index that is represented by the time offset from a certain timing in the serving cell is reported. In FIG. 3, the serving cell and another cell #0 are in an asynchronous state. Note that the serving cell and another cell #0 may be synchronized.

In the serving cell, multiple SS burst sets are placed within an SS burst set cycle, and five SS blocks are transmitted in one SS burst set. Meanwhile, another cell #0 is asynchronous with respect to the serving cell, and the number of SS blocks constituting one SS burst set is different from that in the serving cell. Then, time indices (#0, . . . , #n, . . . ) are defined with reference to certain timing in the serving cell.

In the example shown in FIG. 3, the time indices are provided with reference to the top timing of the SS burst set cycle in the serving cell. To be more specific, in another cell #0, the top SS block in a given SS burst set cycle corresponds to the time index #n. Note that the SS block in the second half of the SS burst set cycle in another cell #0 corresponds to the first half of the SS burst set cycle in the serving cell. Therefore, when the time index reaches the top of the SS burst set cycle in the serving cell, the time index switches to the lowest value.

The UE receives SS blocks in the SS burst set cycle of another cell #0, and detects the SS blocks based on the synchronization signals contained in the SS blocks. For example, the UE measures the RSRP in units of SS blocks, and reports the RSRP measurement results to the network in units of SS blocks.

When the RSRP measurement result of a detected SS block is reported to the network, a time index that is based on a certain timing in the serving cell is used, instead of reading the time index from the PBCH of the SS block. For example, if the SS block at the head of an SS burst set cycle is detected in another cell #0, time index #n with reference to the serving cell is reported.

Thus, when SS blocks are detected in another cell #0, time indices with reference to the serving cell are reported, the network can receive information equivalent to SS block time indices detected from the PBCHs, without increasing the load on the UE.

Note that if multiple SS blocks are detected in another cell, the time indices pertaining to these multiple SS blocks may be each reported to the network. In this case, it is preferable that the measurement results of each detected SS block are reported as individual measurement values without averaging and so on.

Third Embodiment

A third embodiment of the present invention will show an example in which the time index is never read from the PBCH with respect to SS blocks for other cells, regardless of the predetermined information. The third embodiment does not require SS block indices for identifying individual SS blocks to report the cell measurement results in other cells.

If the UE does not decode the PBCHs contained in SS blocks for other cells, the UE performs control so that at least part of the indices for specifying the SS blocks for other cells is not included in the measurement report using SS blocks for other cells. For the serving cell, the UE may also include an SS block index for identifying the SS block of the serving cell, in a measurement report using the SS block.

For example, the UE may assume that, in the serving cell, RSRP measurement results and SS block indices are required for each SS block, while, in other cells, RSRP measurement results and SS block indices are not required for each SS block.

If the UE detects multiple SS blocks for other cells and these SS blocks have the same cell ID, the UE may report the cell-level RSRP associated with this cell ID. Alternatively, if the UE detects a plurality of SS blocks for other cells and these SS blocks have the same cell ID, the UE transmits the top N SS block-level RSRPs among the RSRPs of SS block units.

The UE may combine these two examples, and, for one cell ID, report one cell level RSRP, with the cell ID, and, report the top N SS block-level RSRPs, among the RSRPs of SS block units, without SS block indices.

According to the third embodiment, while an SS block index that can be read from the PBCH in an SS block is not required, information obtained in a step before the PBCH of the SS block is decoded may be reported. For example, to represent an SS block index implicitly, it might occur that part of the information for identifying this SS block can be obtained in a step before the PBCH of the SS block is decoded.

Also, part of the information for identifying an SS block may be obtained from the sequences, the time and/or frequency resources, the scrambling IDs and/or others of the signals (PSS/SSS/PBCH) contained in the SS block and/or certain signals (for example, certain reference signals).

For example, in the event an SS burst index is implicitly used to indicate the time index of an SS block, if the SS burst index can be obtained without decoding the PBCH, the SS burst index may be reported to the network together with SS block-level RSRPs.

According to the third embodiment described above, for example, while, for the serving cell, the UE attaches SS block indices to SS block-level measurement results and reports these, the UE does not report SS block-level measurement results for other cells, or the UE can report the top N SS block-level RSRPs for one cell ID, so that it is possible to reduce the load when the UE decodes the PBCHs of other cells.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 4:
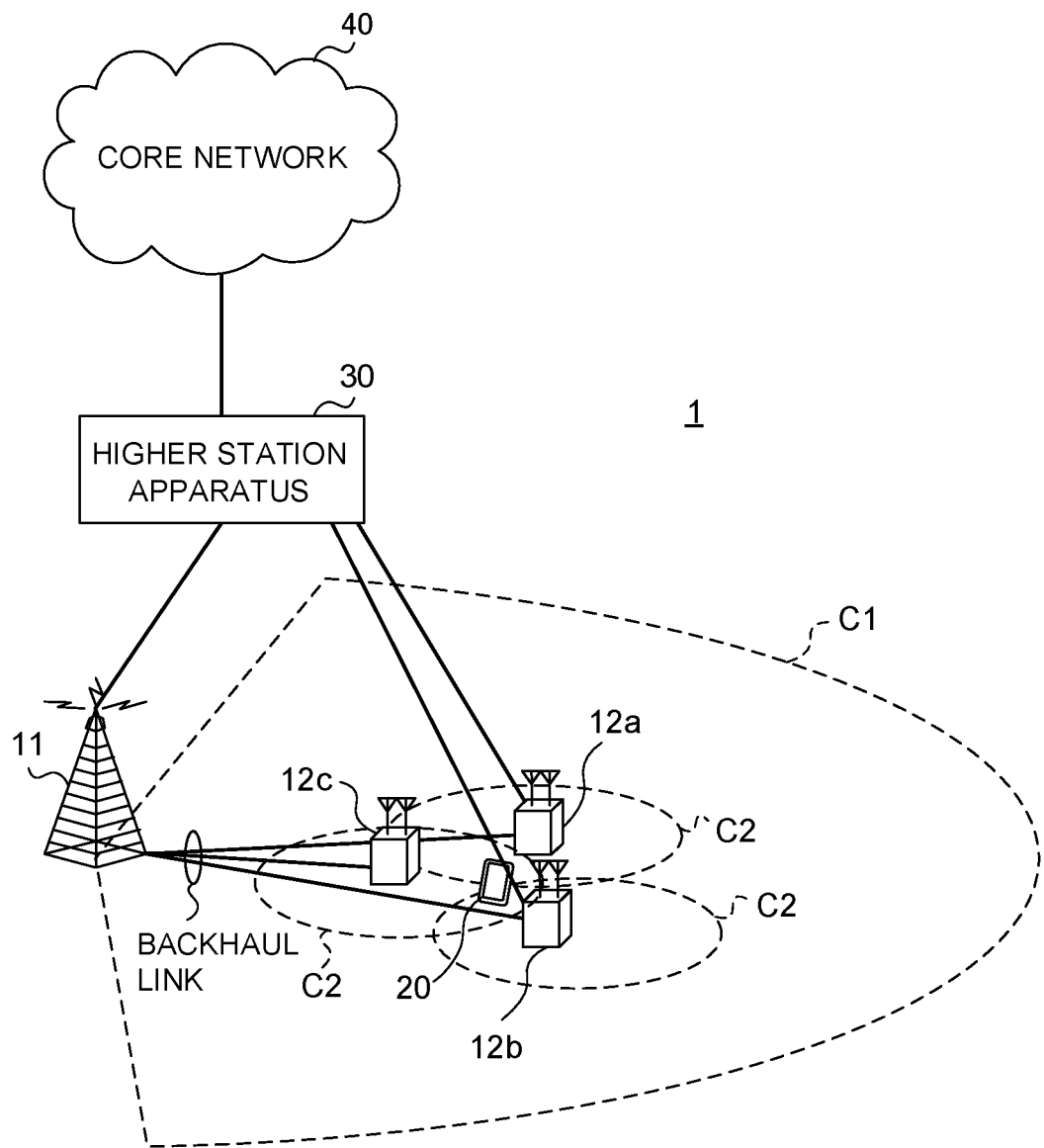
FIG. 4 is a diagram to show an example of a schematic structure of a radio communication system according to one embodiment of the present invention.

FIG. 4 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. The arrangements and the number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminal 20 can communicate using time division duplexing (TDD) and/or frequency division duplexing (FDD) in each cell. Furthermore, in each cell (carrier), a single numerology may be employed, or a plurality of different numerologies may be employed.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. The PDCCH communicates, for example, downlink control information (DCI) that includes PDSCH and/or PUSCH scheduling information, and so on.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 5:
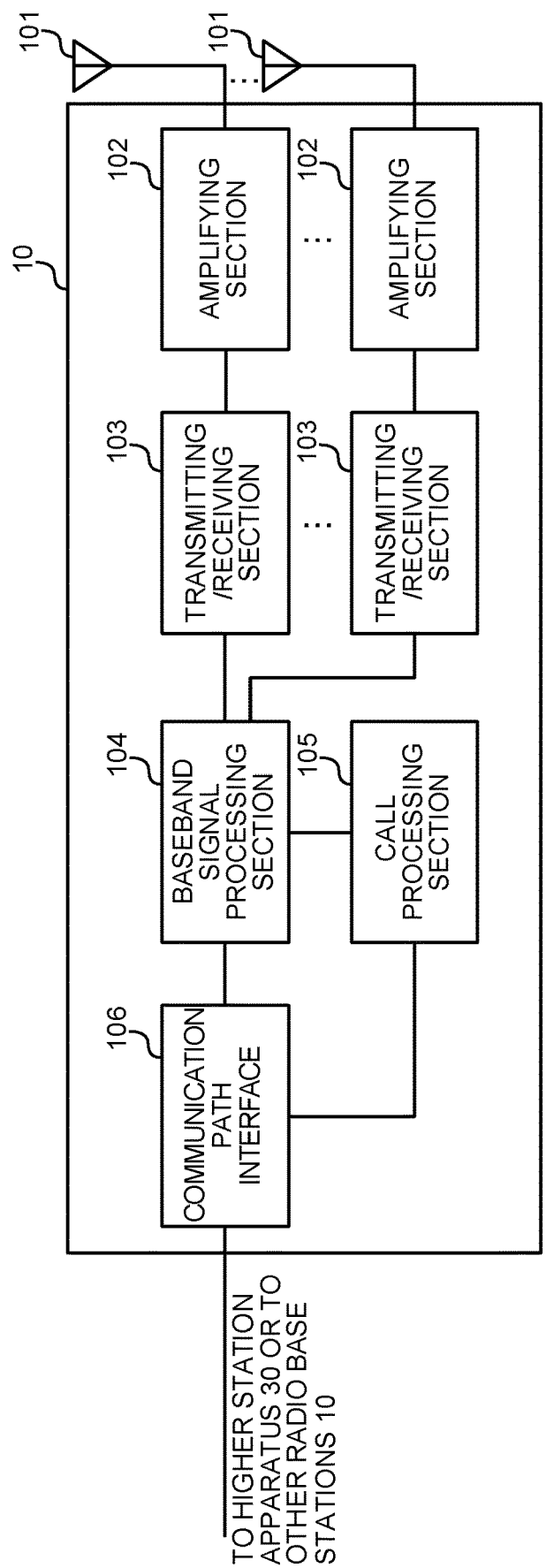
FIG. 5 is a diagram to show an example of an overall structure of a radio base station according to one embodiment of the present invention.

FIG. 5 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit signals using transmitting beams, or receive signals using receiving beams. Transmitting/receiving sections 103 may transmit and/or receive signals using certain beams determined by control section 301.

The transmitting/receiving sections 103 transmit one or more synchronization signal blocks (SS blocks) that contain synchronization signals (for example, NR-PSS, NR-SSS, etc.) and a broadcast channel (for example, NR-PBCH). The transmitting/receiving sections 103 may transmit NR-PBCHs having the same content and/or configuration by using multiple different SS blocks.

The transmitting/receiving sections 103 may transmit a command as to whether or not to decode the PBCHs contained in SS blocks for other cells, information as to whether or not these other cells, which are to be measured, are synchronized with the serving cell, information as to whether or not other cells to be measured adopt single-beam operation, and so on, to the user terminal 20.

The transmitting/receiving sections 103 may receive a cell-level and/or SS block-level measurement report from the user terminal 20.

Figure 6:
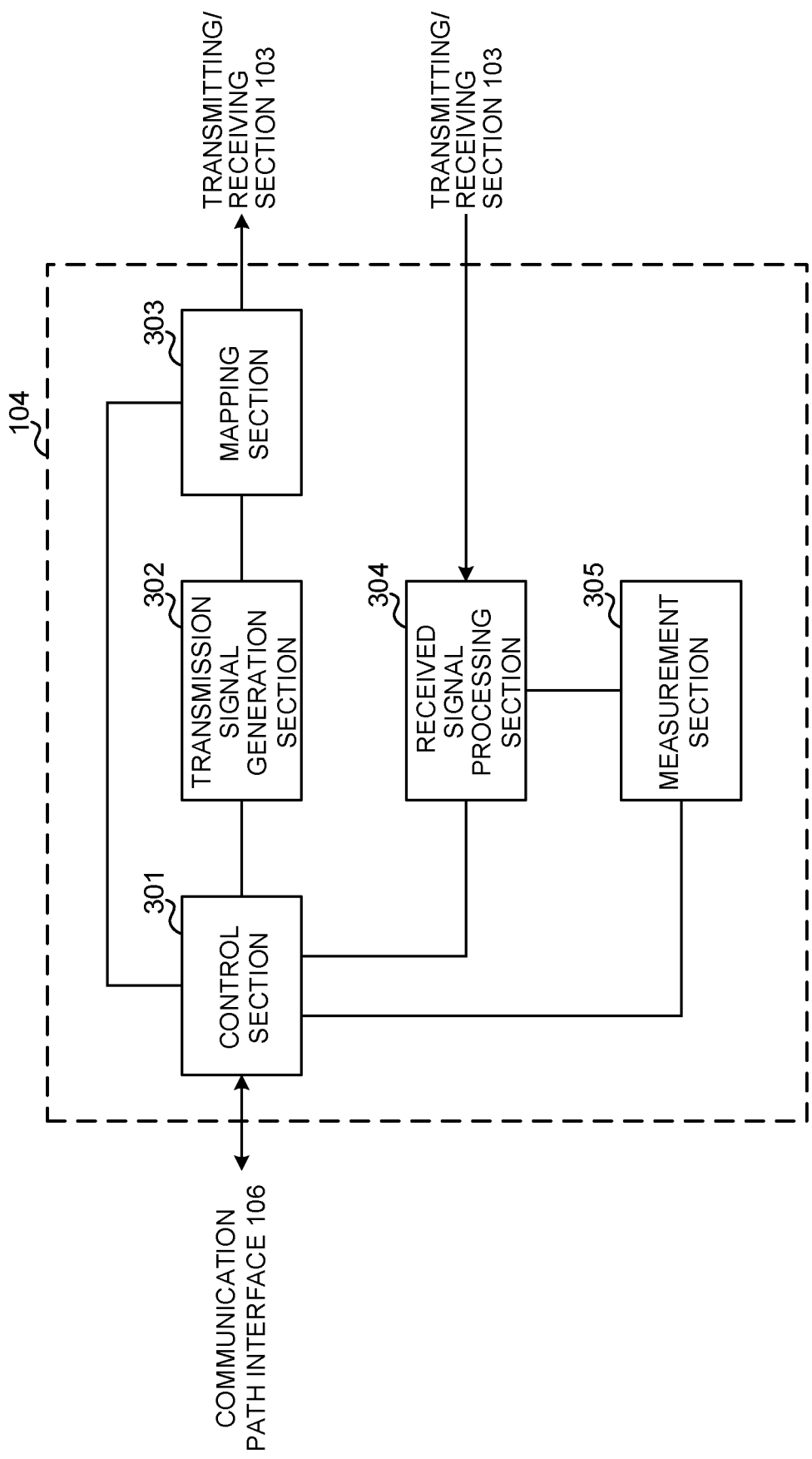
FIG. 6 is a diagram to show an example of a functional structure of radio base station according to one embodiment of the present invention.

FIG. 6 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

The control section 301 also controls scheduling of, for example, uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

The control section 301 may exert control so that transmitting beams and/or receiving beams are formed using digital BF (for example, precoding) in the baseband signal processing section 104 and/or analog BF (for example, phase rotation) in the transmitting/receiving sections 103. The control section 301 may exert control so that beams are formed based on downlink transmission path information, uplink transmission path information and so on. These pieces of transmission path information may be obtained from the received signal processing section 304 and/or the measurement section 305.

The control section 301 may explicitly command the user terminal 20 not to decode the PBCHs contained in SS blocks for other cells, by using RRC signaling or SIBs.

In addition, the control section 301 configures SS blocks so that a certain SS burst set (see FIG. 1) is implemented for each of the serving cell and other cells. Synchronization signals and the PBCH are scheduled in each SS block. For example, as shown in FIG. 2, the transmission/receiving timing in each cell may be controlled so that the serving cell and other cells #0, #1 and #2 are synchronized.

In addition, the control section 301 may receive a report of measurement results (for example, cell-level measurement result, SS block-level measurement result, etc.) in the serving cell and other cells, from the user terminal 20.

For example, in the situation where another cell to be measured is synchronized with the serving cell, the RSRP measurement result in another cell to be measured and timing information (timing information with reference to the serving cell) of SS blocks in this another cell may be received. In this case, the SS block of the reported RSRP measurement result is specified from the SS block timing information. Based on the received measurement result, the control section 301 may determine which beam show good quality in the user terminal 20 and control so that the beam is changed.

In addition, in the situation where another cell to be measured adopts single-beam operation, the control section 301 may receive RSRP measurement results of SS blocks in another cell from the user terminal 20. In this case, the control section 301 can identify SS blocks, even if no SS block index is attached to the report, because it is known that another cell uses single-beam operation.

In addition, the control section 301 may presume that different RRM requirements apply to measurements in other cells when the user terminal 20 decodes the PBCHs contained in SS blocks for other cells and when the user terminal 20 does not decode the PBCHs. For example, when the PBCHs contained in SS blocks for other cells are decoded in the user terminal 20, the control section 301 may presume that at least one of the SINR side condition, the time of measurement, the accuracy of measurement, and the number of signals to be measured has been mitigated.

Also, when the user terminal 20 detects each SS block in another cell and reports the time indices based on the serving cell, the control section 301 may specify the SS blocks which the user terminal 20 has detected in another cell based on the time indices.

Also, when the user terminal 20 reports information that is obtained in a step before decoding the PBCH of an SS block, the control section 301 may specify, from this piece of information, the SS block which the user terminal 20 has detected in another cell.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with corresponding DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio)), the signal strength (for example, RSSI (Received Signal Strength Indicator)), transmission path information (for example, CSI), and so on. The measurement results may be output to the control section 301.

(User Terminal)

Figure 7:
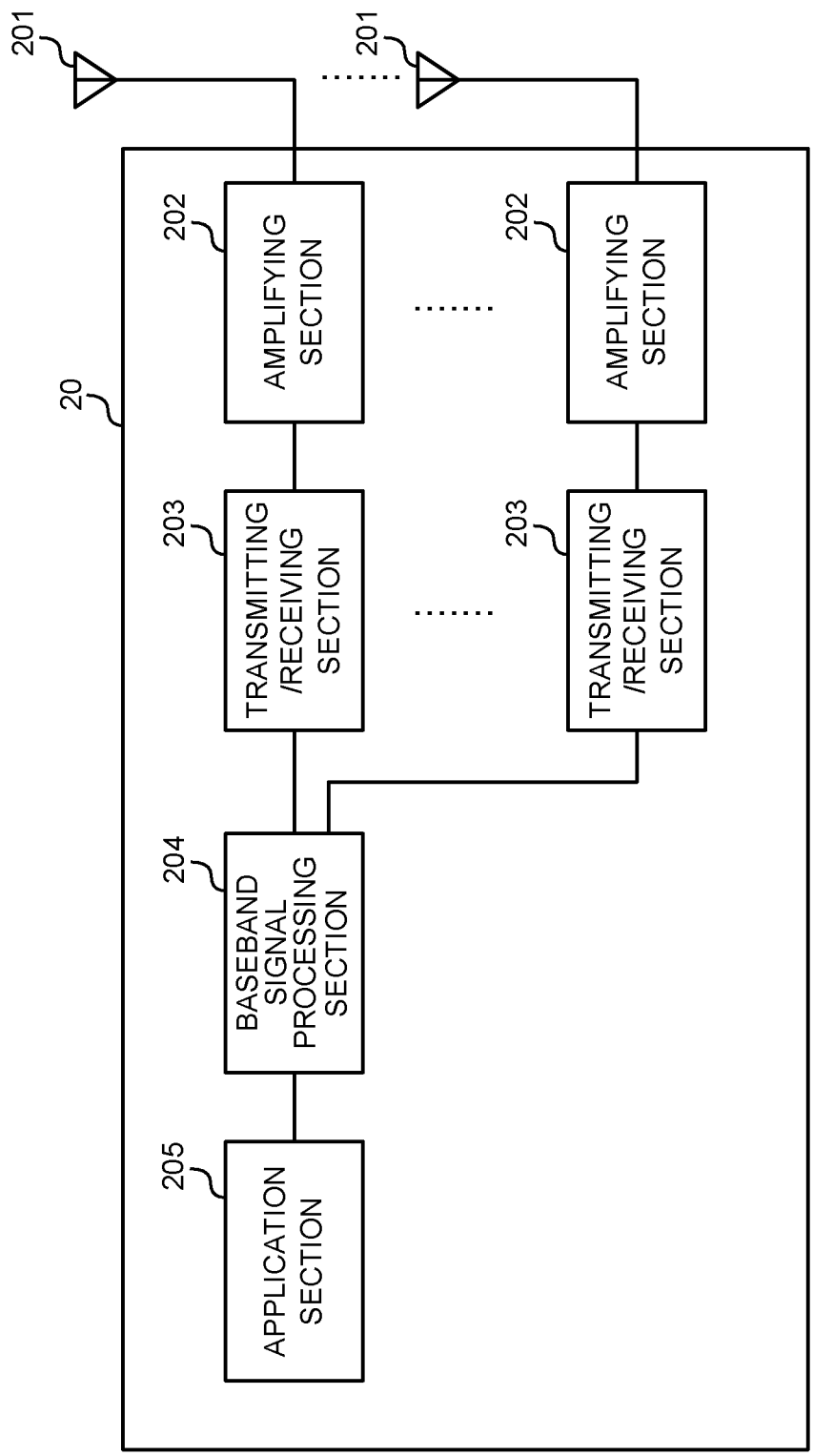
FIG. 7 is a diagram to show an example of an overall structure of a user terminal according to one embodiment of the present invention.

FIG. 7 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains.

Furthermore, the transmitting/receiving antennas 201 may be constituted by, for example, array antennas.

The transmitting/receiving sections 203 may transmit signals using transmitting beams, or receive signals using receiving beams. The transmitting/receiving sections 203 may transmit and/or receive signals using certain beams determined by control section 401.

The transmitting/receiving sections 203 receive one or more synchronization signal blocks (SS block) that contain synchronization signals (for example, NR-PSS, NR-SSS, etc.) and a broadcast channel (for example, NR-PBCH).

The transmitting/receiving sections 203 may receive a command as to whether or not to decode the PBCHs contained in SS blocks for other cells, information as to whether or not other cells to be measured are synchronized with the serving cell, information as to whether or not other cells to be measured adopt single-beam operation, and so on, from the radio base station 10.

The transmitting/receiving sections 203 may transmit a cell-level and/or SS block-level measurement report to the radio base station 10.

Figure 8:
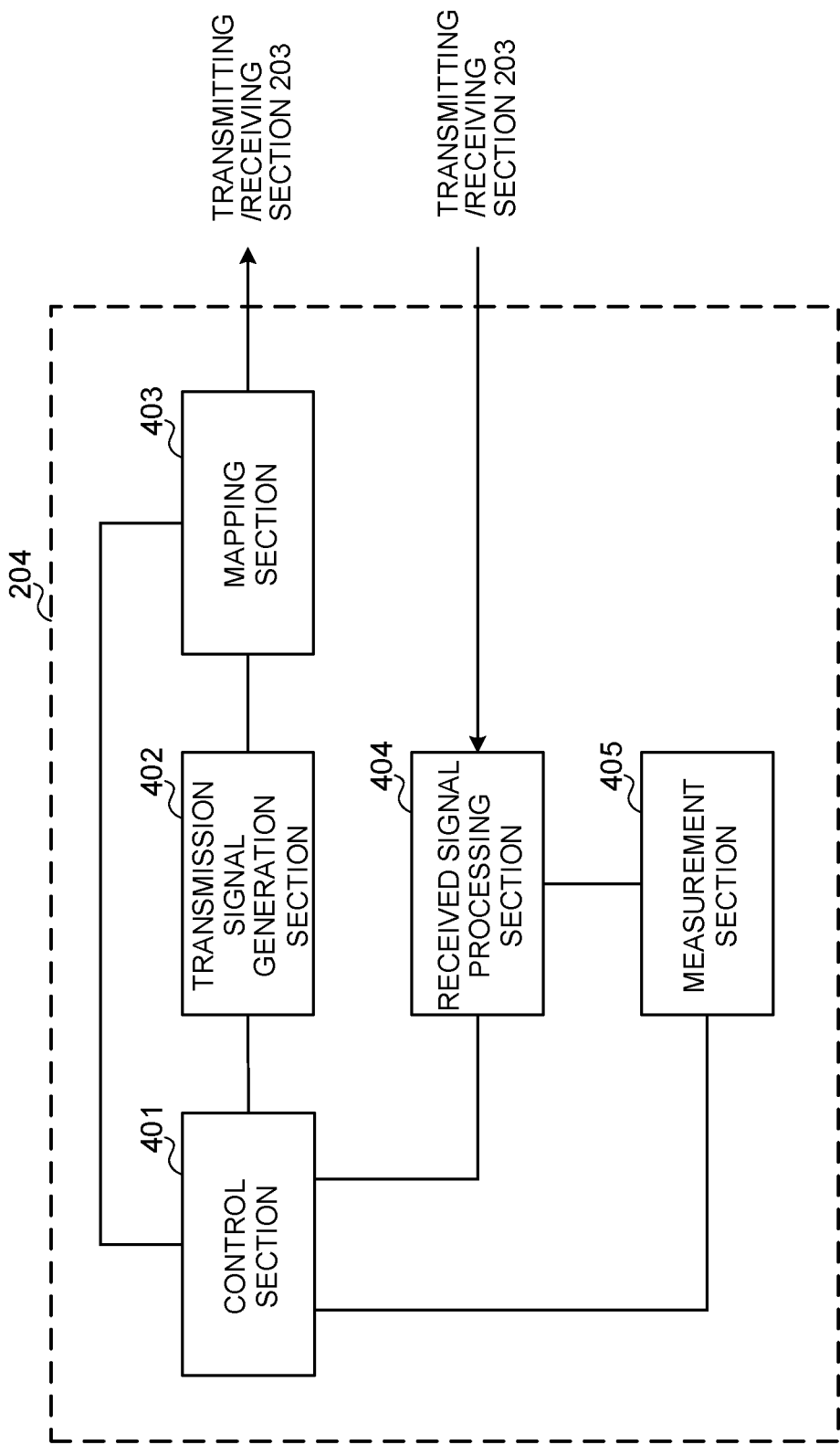
FIG. 8 is a diagram to show an example of a functional structure of a user terminal according to one embodiment of the present invention.

FIG. 8 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 may exert control so that transmitting beams and/or receiving beams are formed using digital BF (for example, precoding) in the baseband signal processing section 204 and/or analog BF (for example, phase rotation) in the transmitting/receiving sections 203. The control section 401 may perform control so that beams are formed based on downlink transmission path information, uplink transmission path information, and so on. These pieces of transmission path information may be obtained from the received signal processing section 404 and/or the measurement section 405.

The control section 401 receives one or more SS blocks that contain synchronization signals and broadcast channels (for example, PBCHs) from the serving cell and other cells, and decides whether or not to decode the PBCHs contained in the SS blocks from other cells based on predetermined information.

The predetermined information may be a command as to whether or not to decode the PBCHs contained in SS blocks for other cells. The control section 401 can use the information as to whether or not another cell to be measured is synchronized with the serving cell, as the predetermined information. Further, the control section 401 can use information as to whether or not another cell to be measured adopts single-beam operation, as the predetermined information.

When the PBCHs contained in SS blocks for other cells are not decoded, the control section 401 may specify the timing at which an SS block is detected in another cell based on a certain timing in the serving cell.

Also, if the PBCHs contained in SS blocks for other cells are not decoded, the control section 401 may perform control so that at least part of the indices for specifying the SS blocks of the other cell is not included in a measurement report using SS blocks for other cells. The control section 401 may perform control so that indices for specifying the SS blocks of the serving cell are contained in a measurement report using SS blocks related to the serving cell, indices for specifying SS blocks for other cells are not contained in a measurement report using SS blocks related to other cells.

Also, in the event the control section 401 decides whether or not to decode the PBCH contained in an SS block for another cell based on predetermined information, and as a result of this, decodes the PBCH of the SS block of another cell, the control section 401 may apply different RRM requirements to the measurements (including SS block level measurement) in another cell than in the case of not decoding the PBCH contained in the SS block. For example, in the event the UE decodes the PBCH contained in an SS block for another cell, the UE applies moderate RRM requirements to measurements for another cell compared to when not decoding PBCH.

In addition, when various pieces of information reported from the radio base station 10 are acquired from the received signal processing section 404, the control section 401 may update the parameters used for control based on the information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 9:
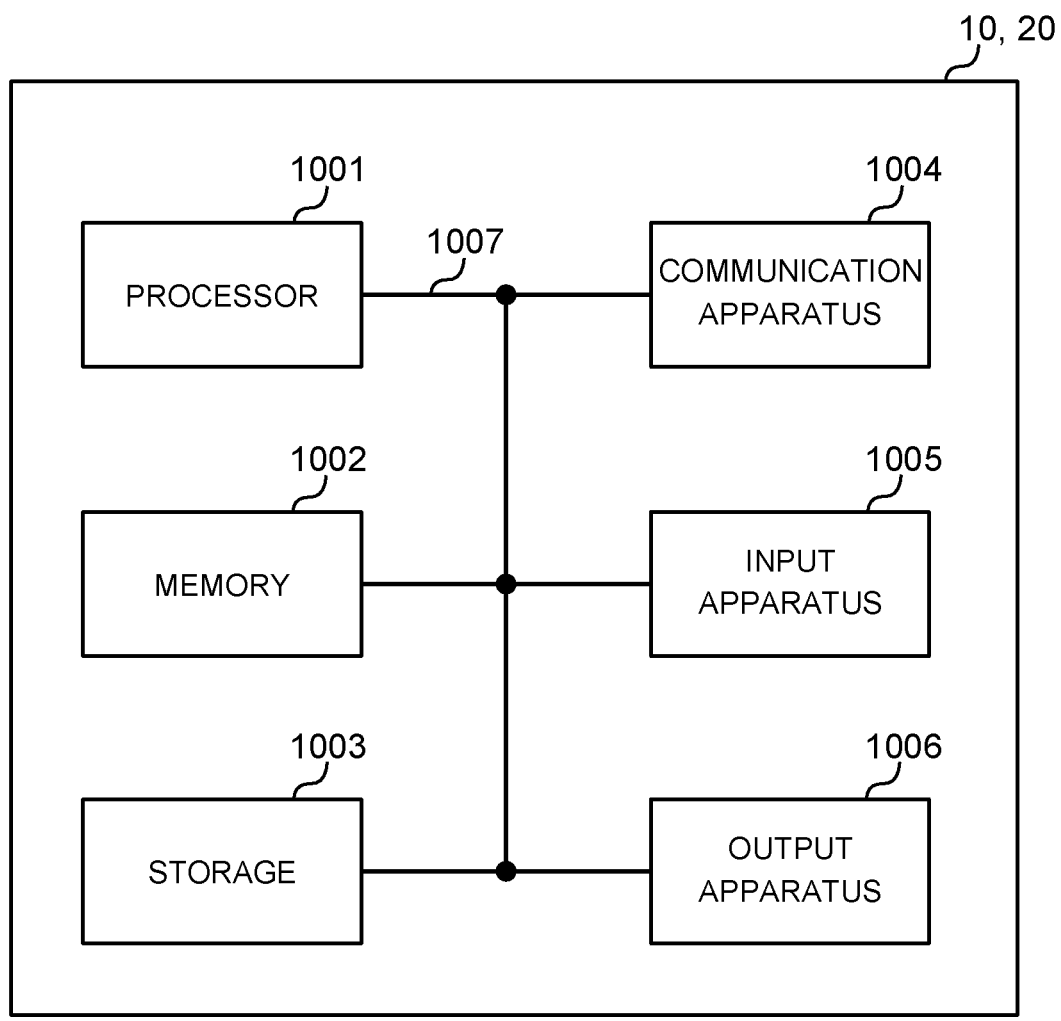
FIG. 9 is a diagram to show an example of a hardware structure of a radio base station and a user terminal according to one embodiment of the present invention.

For example, the radio base station, user terminals and so on according to embodiments of the present invention may function as a computer that executes the processes of the radio communication method of the present invention. FIG. 9 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading certain software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side. For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a synchronization signal block including a synchronization signal and a broadcast channel; and
a processor that, when information that indicates whether a neighbor cell is synchronized with a serving cell is notified from a base station to the terminal, derives, based on a timing of the serving cell, a synchronization signal block index of a synchronization signal block transmitted by the neighbor cell.

2. The terminal according to claim 1, wherein, when the information is notified to the terminal, the processor does not decode the broadcast channel that is included in the synchronization signal block of the neighbor cell for a purpose of obtaining timing information of the synchronization signal block of the neighbor cell.

3. The terminal according to claim 2, wherein, when the processor does not decode the broadcast channel that is included in the synchronization signal block of the neighbor cell, the processor applies a radio resource measurement (RRM) requirement that is different to a RRM requirement for when the processor decodes the broadcast channel that is included in the synchronization signal block of the neighbor cell.

4. The terminal according to claim 3, wherein when the processor decodes the broadcast channel that is included in the synchronization signal block of the neighbor cell, the processor applies an RRM requirement that is more relaxed than the RRM requirement for when the processor does not decode the broadcast channel that is included in the synchronization signal block of the neighbor cell.

5. The terminal according to claim 3, wherein the RRM requirement applied by the processor is a requirement for a measurement.

6. A radio communication method for a terminal comprising:
- receiving a synchronization signal block including a synchronization signal and a broadcast channel; and
- when information that indicates whether a neighbor cell is synchronized with a serving cell is notified from a base station to the terminal, deriving, based on a timing of the serving cell, a synchronization signal block index of a synchronization signal block transmitted by the neighbor cell.

7. The terminal according to claim 4, wherein the RRM requirement applied by the processor is a requirement for a measurement.

8. A base station comprising:
- a transmitter that transmits a synchronization signal block including a synchronization signal and a broadcast channel; and
- a processor that performs a control to transmit, to a terminal, information that indicates whether a neighbor cell is synchronized with a serving cell to make the terminal derive a synchronization signal block index of a synchronization signal block transmitted by the neighbor cell based on a timing of the serving cell.

9. A system comprising:
a terminal that comprises:
- a receiver that receives a synchronization signal block including a synchronization signal and a broadcast channel; and
- a first processor that, when information that indicates whether a neighbor cell is synchronized with a serving cell is notified from a base station to the terminal, derives, based on a timing of the serving cell, a synchronization signal block index of a synchronization signal block transmitted by the neighbor cell; and a base station that comprises:
- a transmitter that transmits the synchronization signal block; and
- a second processor that performs a control to transmit, to the terminal, the information.

* * * * *